United States Patent [19]

Murata et al.

[11] Patent Number: 4,707,593
[45] Date of Patent: Nov. 17, 1987

[54] VISIBLE IMAGE MAGNETIC CARD

[75] Inventors: Yasuzo Murata; Takeo Yokoyama, both of Kanagawa; Hiroyuki Wada; Masaaki Sakurai, both of Tochigi, all of Japan

[73] Assignees: Pilot Man-Nen-Hitsu Kabushiki Kaisha; The Nippon Signal Co., Ltd., both of Japan

[21] Appl. No.: 866,418

[22] Filed: May 23, 1986

[51] Int. Cl.$^4$ ............................................. G06K 19/00
[52] U.S. Cl. .................................... 235/487; 235/493
[58] Field of Search ................................ 235/487, 493

[56] References Cited

U.S. PATENT DOCUMENTS 4,544,834 10/1985 Newport .............................. 235/487

Primary Examiner—Harold I. Pitts
Attorney, Agent, or Firm—Sughrue, Mion, Zinn, Macpeak, and Seas

[57] ABSTRACT

A visible image magnetic card employing a magnetic recording sheet having a sandwich of a magnetic recording layer and a base sheet. A display sheet has a transparent display area with a display cell is formed between the display sheet and the magnetic recording sheet. The cell houses a mixture of magnetic particles and a transparent or translucent fine fluidizing powder.

17 Claims, 3 Drawing Figures

VISIBLE IMAGE MAGNETIC CARD

BACKGROUND OF THE INVENTION

This invention relates to a recording card for displaying updatable magnetic information as a visible image. More particularly, the invention relates to a visible image magnetic card comprising a magnetic recording sheet, a display sheet, and a display cell which is sandwiched therebetween, with magnetic particles confined within the display cell. In this magnetic card, a magnetic latent image is formed in the area of the magnetic recording sheet which corresponds to the display cell and the magnetic particles are transported through the display cell such that they form a visible image in a pattern related to the latent image.

A magnetic card can, in general, be fabricated using comparatively inexpensive and highly reliable components in the record/reproduce system. In addition, the magnetic card has a comparatively large recording capacity, permits instantaneous recording, reproduction and erasure, can be reused. This offers convenience in carrying and handling, and the device may be manufactured at low cost. Because of these many advantages, the magnetic card is currently used for cash cards, credit cards, train ticket credit cards and other media for transferring information to and from automatic dispensing machines and office-automation equipment.

One problem with known magnetic cards is that the information recorded thereon is invisible. Separate printers, typically impact types are used to separately provide a visual image. A need therefore exists to develop a magnetic card that presents a desired part of the recorded information as a visible image in the form of letters or numbers and does not require separate printers.

In order to meet this need, the inventors have proposed a visible image magnetic card which consisted of a magnetic recording sheet, a transparent sheet, and a display cell sandwiched therebetween in which magnetic particles were confined in such a manner that they could migrate from one location to another. Such is disclosed in Japanese Patent Publication No. 852/1981. When a magnetic latent image is formed in the area of the magnetic recording sheet which corresponds to the display cell by magnetizing said area with a multi-track (e.g 7-track) head, the magnetic particles in the display cell are attracted to the image area, producing a visible contrast with the unmagnetized non-image area. The visible image may be updated by erasing it and then writing a new magnetic latent image. One problem with this technique is that the image is not sharp.

SUMMARY OF INVENTION

This requirement cannot be fully satisfied by simply confining magnetic particles within the display cell. More specifically, if the card is inclined or otherwise moved to cause the magnetic particles to transverse the display cell toward the image area, some of the magnetic particles will adhere to the walls defining the display cell, i.e., the magnetic recording sheet and the display sheet, thereby producing a defective display. In addition, the magnetic particles will readily agglomerate to reduce the resolution of the image.

The inventors therefore closely studied the agglomeration of magnetic particles in the display cell and their adhesion to the walls defining the display cell. As a result, the inventors found that the force causing these phenomena is the attraction between the electric charges which are generated by friction between individual magnetic particles or between such particles and the walls defining the display wall. It has been discovered that it is essential to eliminate the effects of triboelectricity for the purpose of producing a sharp alphanumeric display on the magnetic card. The present invention has been accomplished on the basis of these discoveries.

The visible image magnetic card of the present invention comprises a mangnetic recording sheet composed of a magnetic recording layer and a base sheet, and a display sheet having a transparent display area. A display cell is formed between the two sheets and has confined therein a mixture of magnetic particles and a transparent or translucent fine fluidizing power.

The mechanism by which a visible image is formed in the magnetic card of the present invention is the downward attraction of magnetic particles to a magnetic latent image. Successful image formation requires preventing the magnetic particles from agglomerating and adhering to the walls which define the display cell.

In accordance with the present invention, both magnetic particles and a fine fluidizing powder are confined within the display cell in such a manner that a portion of the fluidizing powder covers the surfaces of the magnetic particles. The fluidizing powder on the magnetic particles reduces the adhesion and the coefficient of friction between the magnetic particles, thereby increasing the flow of the magnetic particles to an extent sufficient to prevent their agglomeration. The remaining portion of the fluidizing powder will adhere uniformly to the surfaces of the magnetic recording sheet and the display sheet which define the display cell. This reduces the adhesion and triboelectricity between each of the sheets and the magnetic particles, thereby preventing adhesion of the magnetic particles to the walls defining the display cell.

It is not completely known why the fine fluidizing powder is effective for preventing triboelectrification on the magnetic particles in the display cell. However, it is believed that when two materials are rubbed against each other, some of the frictional energy is converted to electrostatic energy causing triboelectricity. If a film of the fine fluidizing powder is present on both the magnetic particles and the walls defining the display cell, friction occurs between the particles of the fluidizing powder. Even if these particles are electrified, those present on the magnetic particles attract particles on the walls defining the display cell and vice versa. Consequently, the particles of the fluidizing powder transfer from the magnetic particles to the walls or vice versa, thereby reducing the force of triboelectric attraction between the magnetic particles and the walls which define the display cell.

The fine fluidizing powder used in the present invention should be transparent or translucent. The film of the transparent or translucent find fluidizing powder forming on the magnetic particles or the walls which define the display cell is thin and will not impair the color of the magnetic particles or the transparency of the display area.

After forming a magnetic latent image on that area of the magnetic recording sheet which corresponds to the display cell, the visible image magnetic card of the invention may orientate (e.g. from horizontal to vertical), whereupon the magnetic particles in the display cell come down by gravity. In this case, the fine fluidizing powder on the magnetic particles aids in attraction only to the magnetized area without forming agglomerations or adhering to the walls defining the display cell. As a result, a sharp display is obtained, with a satisfactorily high contrast produced between the magnetized area which has attracted the magnetic particles and the unmagnetized area which has not attracted any magnetic particles.

The base sheet and the magnetic particles which are employed in the visible image magnetic card of this invention may assume any colors that produce a chromatic contrast. If the base sheet is light-reflective while the magnetic particles are light-absorbing, a sufficiently large difference in light reflectance to produce a high contrast will occur between the magnetized area to which the magnetic particles have been attracted and the unmagnetized area where no magnetic particles have been deposited.

As described herein in detail, this invention provides a visible image magnetic card which is capable of producing a visible image having a high degree of sharpness that has not been attainable by prior art techniques. A particular advantage will result if the fine fluidizing powder is electrically conductive since electrification of the magnetic particles and the walls defining the display are attenuated to such a great extent that the magnetic particles are more effectively prevented from deposition on the walls which define the display cell.

The visible image magnetic card of this invention will be described in greater detail with reference to the accompanying drawings and the description of the preferred embodiment that follows.

DESCRIPTION OF THE PREFERRED EMBODIMENTS

Figure 1:
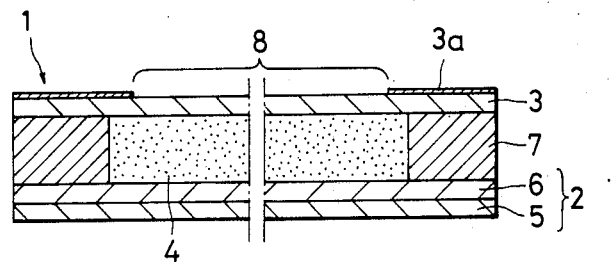
FIG. 1 is an enlarged vertical section of the visible image magnetic card of this invention, with the central portion omitted.

As shown in FIG. 1, the visible image magnetic card 1 of the invention employes magnetic particles of high permeability and a transparent or translucent fine fluidizing powder. The device comprises essentially a magnetic recording sheet 2, a display sheet 3 and a display cell 4. The magnetic recording sheet 2 has a magnetic layer 5 and a light-reflective base sheet 6, with the layer 5 formed on part or all of the surface of the base sheet 6 by a suitable means such as coating, printing, transfer or bonding. The magnetic layer 5 is made of a magnetic powder, a binder and additives. The magnetic powder may be formed of substances that are employed in magnetic recording materials, such as gamma-iron oxide ($\gamma$-$Fe_2O_3$), cobalt-coated gamma-iron oxide (Co. $\gamma$-$Fe_2$)$_3$) and barium ferrite ($BaO.6Fe_2O_3$). The magnetic layer 5 is designed to have coercive force (Hc) and saturation magnetization ($\sigma s$) values that are adapted to the recording system of the magnetic visible card.

The base sheet 6 is typically rendered light-reflective by forming it from a light-reflective material. Alternatively, a non-reflective base sheet may be provided with an aluminum layer by evaporation or it may be coated with other light-reflective layers. The base sheet 6 preferably has a light reflectance of 50% or more an best results are obtained if its color is pale or silver.

The magnetic recording sheet 2 is positioned in a face-to-face relationship with the display sheet 3. A spacer 7 in the form of a plastic sheet is sandwiched between the two members which are joined together by a reactive adhesive, a hot-melt adhesive or by thermal bonding of the display sheet 3, spacer 7 and the base sheet 6. The spacer 7 is provided with a through-hole in a rectangular form. The hole forms the display cell 4 and that area of the display sheet 3 which corresponds to the display cell 4 forms a display area 8.

If the card is inclined after some of the magnetic particles are attracted to the magnetized area, the remaining excess magnetic particles will flow down by gravity and rest in the lower part of the display cell or at two corners thereof. From an aesthetic viewpoint, these unattracted magnetic particles are preferably invisible. To this end, the display area 8 may be formed sufficiently smaller than the area of the display cell 4 to cover any excess magnetic particles. This embodiment may be attained by providing a color ink-printed area 3a over the entire surface of the display sheet except for a predetermined display area.

The shape, size and position of the display cell 4 in the magnetic card 1 may be changed depending on the utilization. The thickness of the display cell may also vary with the use of the card but the advantageous range is from 50 to 1,000 microns.

The magnetic particles and the fire fluidized powder which are used in the present invention are hereunder described in more detail.

The magnetic particles used in the present invention are preferably selected from those which have high permeability and exhibit strong magnetism in a magnetic field. Such high-permeability magnetic particles are made of metallic or alloy-based magnetic materials such as iron, nickel, stainless steel and permalloy, or of oxide-based or ferritic magnetic materials such as tri-iron tetroxide ($Fe_3O_4$), gamma-iron oxide ($\gamma$-$Fe_2O_3$) and ferrite (MO $Fe_2O_3$). The magnetic particles have preferably a granular or spherical shape that permits smooth rotation of the particles. The advantageous particle size ranges from 10 to 100 microns. A magnetic material which is in a fine particulate form may be granulated with the aid of an appropriate binder to form magnetic particles ranging from 10 to 100 microns in size. The surfaces of magnetic particles may be pigmented or otherwise treated to provide a color that differs from their inherent color. The magnetic particles are confined in the display cell in amounts which preferably range from approximately 1 to 50% of the cell volume.

The fine fluidizing powder suitable for use in the present invention may be selected from among inorganic fine powders of silicic anhydride, siliicate sale, aluminum oxide, magnesium oxide, calcium carbonate, basic magnesium carbonate and titanium oxide, or inorganic electroconductive fine powders of tin oxide, zinc oxide and cuprous iodide. In addition, such powders must have the ability to adhere to the surfaces of the magnetic particles and the walls defining the display cell. This is necessary to reduce the adherence and coefficient of friction between magnetic particles and between magnetic particles and the walls defining the display cell. The fine fluidizing powder to be used in the present invention may be subjected to surface treatment such as one for rendering it hydrophobic. The primary particles in the powder may be fine particles ranging from 0.01 to 2 microns in size, with particles no larger than 5 microns being preferable.

The transparent or translucent fine fluidizing powder and the magnetic particles are mixed before they are introduced into the display cell. If desired, a liquid dispersion of colloidal silica or colloidal alumina may be mixed with the magnetic particles and the mixture dried to form a silica or alumina deposit on the surfaces of magnetic particles. The colloidal silica or alumina thus introduced into the display cell has no film-forming ability and will adhere to the walls defining the display cell. The magnetic particles which have been surface-treated in this manner are also included within the category of the "mixture of magnetic particles and fine fluidizing powder" as used in the present invention.

The magnetic particles are preferably mixed with the fine fluidizing powder in such proportions that 0.1-10 parts by weight of the fluidizing powder is used with 100 parts by weight of the magnetic particles. If less than 0.1 parts by weight of the fluidizing powder is used, satisfactory results cannot be attained by mixing it with the magnetic particles. Using more than 10 parts by weight of the fluidizing powder is also undesirable because of the poor flowability of the particles in the fluidizing powder. This will impair, rather than improve, the flowability of the magnetic particles.

Figure 2:
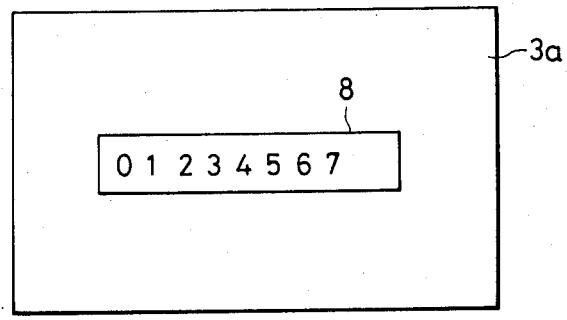
FIG. 2 is a front view of magnetic card of FIG. 1.
Figure 3:
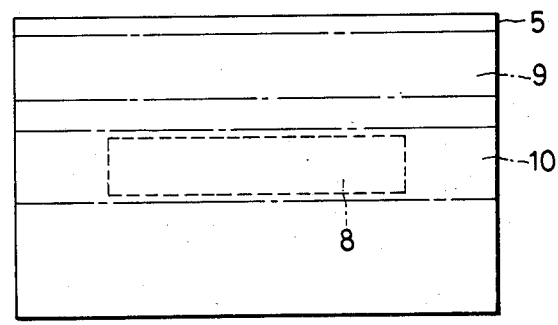
FIG. 3 is a rear view of the card of FIG. 1.

Magnetic information is written in the magnetic card using a standard magnetic head for an information code WRITE track indicated at 9 in FIG. 3. A multitrack (e.g. 7-track) head may be employed for writing in a video information WRITE track 10. In writing mode, the multitrack head is supplied with a current which is related to the conversion of the video information to an alphanumeric pattern, thereby forming image areas that produce the intended alphanumeric pattern on the track 10. Magnetic particles then are attracted to the image areas, thereby producing a visible image of the magnetic particles which corresponds to the video information such as illustrated in FIG. 2. The above described method of producing a visible image is of the positive type in that the magnetized area serves to provide image areas. Alternatively, the visible image may be formed by a negative process wherein the unmagnetized area acts to produce image areas.

EXAMPLES

The visible image magnetic card of the present invention is hereunder described in greater detail with reference to the following examples wherein all "parts" are by weight.

EXAMPLE 1

A magnetic recording sheet and a spacer were provided. The recording sheet consisted of a white polyester film having a thickness of 50 microns and an underlying magnetic layer formed of gamma-iron oxide ($\gamma$-$Fe_2O_3$) particles which were 13 microns in size. The spacer was made of a polyester film 300 microns thick which had a punched-out central rectangular opening (11 mm×43 mm). An epoxy adhesive layer was formed on the underside of the spacer, which then was pressed against the film side of the magnetic recording sheet and heat-cured. A mixture (40 mg) of the following components was placed in the central opening in the spacer in an amount of abut 11% of the cell volume:

| | |
|---|---|
| Magnetic particles | |
| Spherical reduced iron particles (av. size, 50 μm: DMF-250 of Dowa Teppun Kogyosha) | 99 parts |
| Fine fluidizing powder | |
| Fine tin oxide based powder (ELCOM TI 20 of Catalysts & Chemicals Ind. Co., Ltd.) | 1 part |

Another epoxy adhesive layer was formed on top of the spacer, which then was pressed against a display sheet (i.e., a polyester film 50 microns in size) and heat-cured. Subsequently, a color ink layer was printed on the entire surface of the display sheet except for a central display area in a rectangular form (8 mm× 40mm). The peripheral edges of the assembly was trimmed by punching to produce a visible image magnetic card having outside dimensions of 56 mm×85 mm.

In examples 2 to 6 and Comparative Examples 1 to 3, samples of visible image magnetic card were fabricated as in Example 1 except that the composition of the mixture of magnetic particles and fine fluidizing powder was changed as shown in Table 1.

Alphanumeric characters were recorded on the samples of magnetic card with an encoder having a 7-track magnetic head. When each of the cards fabricated in Examples 1 to 6 was inclined, a sharp visible image formed rapidly. When the information was updated with the same encoder, a sharp visible display could also be produced rapidly. On the other hand, no such sharp display could be attained with the magnetic cards of Comparative Examples 1 to 3 which did not employ the fine fluidizing powder. In those examples, magnetic particles adhered to the magnetic recording sheet or the display sheet.

TABLE 1

| Run No. | Magnetic particles | | | Fine fluidizing powder | | | | Sharpness of image |
|---|---|---|---|---|---|---|---|---|
| | A | B | C | D | E | F | G | H | |
| Example | | | | | | | | | |
| 1 | (99) | | | (1) | | | | | O |
| 2 | (99) | | | | (1) | | | | O |
| 3 | (98) | | | | | (2) | | | O |
| 4 | | (99) | | | | | (1) | | O |
| 5 | | (99) | | | | | | (1) | O |
| 6 | | | (97) | (3) | | | | | O |
| Comparative Example | | | | | | | | | |
| 1 | (100) | | | none | | | | | X |
| 2 | | (100) | | none | | | | | X |
| 3 | | | (100) | none | | | | | X |

The symbols used in the table denote the following:
A: spherical reduced iron particles;
B: Spherical Mo $Fe_2O_3$ granules (KBN-100 of Hitachi Metals, Ltd.);
C: $Fe_3O_4$ granules (BP-300 of Tokushu Toryo Co., Ltd.);
D: fine tin oxide powder;
E: $Al_2O_3$ (Aluminum Oxide C of Nippon Aerosil Co., Ltd.);
F: $TiO_2$ (Titanium Oxide P-25 of Nippon Aerosil Co., Ltd.);
G: hydrophobic $SiO_2$ (Aerosil R972 of Nippon Aerosil Co., Ltd.);
H: $SnO_2$ (DIA ECP T-1 of Mitsubishi Metal Corp.);
O: good; and X: poor.

EXAMPLE 7

Eighty parts of spherical reduced iron particles (DMF-250) was mixed with 29 parts of colloidal silica (snowtex 20 of Nissan Chemical Industries., Ltd.) and the mixture was dried to provide a reduced iron powder wherein the spherical particles were coated with the fine particles of colloidal silica. A portion (40 mg) of this powder was confined in the display cell of a magnetic card as in Example 1. A sharp visible alphanumeric display was also attained from the card.

As is apparent from the results obtained in Examples 1 to 6, the visible image magnetic card of the present invention which employs a transparent or translucent fine fluidizing powder in combination with magnetic particles is capable of rapid formation of a visible image. Such is in contrast to the prior art wherein a sharp display is not attainable from a magnetic card wherein only magnetic particles are confined in the display cell. The visible image magnetic card of the present invention has rapid access time and provides a sharp display. Because of these features, the magnetic card of the invention has great potential for use for train ticket credit cards, telephone cards, cash cards, credit cards and other mediums for storing various items of information (e.g. the amount of money paid, the number of times of use, and the number of items bought). It is apparent that modifications of the invention may be practiced without departing from the essential scope of the invention.

What is claimed is:

1. A visible image magnetic card comprising; a magnetic recording sheet comprising a magnetic recording layer and a base sheet, a display sheet having a transparent display area, a display cell formed between said magnetic recording sheet and said display sheet, said display cell having confined therein a mixture of magnetic particles and a transparent or translucent fine fluidizing powder.

2. A visible image magnetic card according to claim 1 wherein said base sheet is light-reflective.

3. A visible image magnetic card according to claim 1 wherein said display area is smaller than the area of said display cell.

4. A visible image magnetic card according to claim 1 wherein said display cell is formed by a substrate with an opening which is sandwiched between said magnetic recording sheet and said display sheet.

5. A visible image magnetic card according to claim 4 wherein each of said base sheet, said display sheet and said substrate with an opening is a plastic sheet.

6. A visible image magnetic card according to claim 1 wherein said display cell has a thickness of 50 to 1,000 microns.

7. A visible image magnetic card according to claim 1 wherein said magnetic particles comprise a material selected from the group consisting of iron, nickel, stainless steel, permalloy, tri-iron tetroxide, gamma-iron oxide and ferrite.

8. A visible image magnetic card according to claim 1 wherein said magnetic particles have a size range of 10 to 100 microns.

9. A visible magnetic card according to claim 1 wherein said magnetic particles account for 1 to 50% of the volume of the display cell.

10. A visible magnetic card according to claim 1 wherein said fine fluidizing powder is comprised of a material selected form the group consisting of silicic anhydride, a silicate salt, aluminum oxide, magnesium oxide, calcium carbonate, basic magnesium carbonate, titanium oxide, colloidal silica, colloidal alumina, tin oxide, zinc oxide and cuprous iodide.

11. A visible image magnetic card according to claim 10 wherein said fine fluidizing powder is electrically conductive.

12. A visible image magnetic card according to claim 1 wherein said fine fluidizing powder consists of particles no larger than 5 microns in size.

13. A visible image magnetic card according to claim 1 wherein said fine fluidizing powder is present in an amount of 0.1 to 10 parts by weight for 100 parts by weight of said magnetic particles.

14. A visible image magnetic card of claim 7 wherein said magnetic particles are granulated to permit rotation.

15. A visible image magnetic card of claim 1 wherein said magnetic particles are pigmented to a color.

16. A visible image magnetic card of claim 2 wherein said base sheet has a light reflectance of at least 50%.

17. A visible image magnetic card of claim 1 further comprising a spacer between said display sheet and said base sheet.

* * * * *